DANIEL SILVERMAN
INVENTOR.

Dec. 31, 1968     D. SILVERMAN     3,419,853
ANALOG-DIGITAL SYSTEM FOR PROCESSING SEISMIC SIGNALS
Filed May 4, 1966     Sheet 3 of 5

DANIEL SILVERMAN
INVENTOR.

BY John D. Gassett

ATTORNEY

DANIEL SILVERMAN
INVENTOR.

BY John D. Gassett
ATTORNEY

DANIEL SILVERMAN
INVENTOR.

United States Patent Office 3,419,853
Patented Dec. 31, 1968

3,419,853
ANALOG-DIGITAL SYSTEM FOR PROCESSING SEISMIC SIGNALS
Daniel Silverman, Tulsa, Okla., assignor to Pan American Petroleum Corporation, Tulsa, Okla., a corporation of Delaware
Filed May 4, 1966, Ser. No. 547,650
16 Claims. (Cl. 340—172.5)

ABSTRACT OF THE DISCLOSURE

This invention concerns a hybrid type filtering system using a digital computer in conjunction with an analog computer whereby the best features of each are utilized. Novel analog filtering means are disclosed.

---

This invention relates to the art of filtering a time-varying signal. In one form, it more patricularly concerns the processing or filtering of a time-variant signal such as a seismic signal, including for example the mathematical process of convolution together with time adjustments, sorting of data etc., in which such process is done partly in analog form and partly in digital form in a hybrid type apparatus of an analog filter means in combination with a digital computer. The analog filtering system is external of the computer or externally between the computer and a display or recording device.

There are many technological areas where electrical time functions or analog signals such as seismic signals are operated upon. When seismic signals are processed they are subject to many time corrections and sorting which have conventionally been done by various electro-mechanical devices. Many times such signals are required to be "stacked" which is a combination or addition of different signals. In the past this "stacking" has been done by analog methods of simultaneously reproducing the various signals as from magnetic tape and adding them. It has been found that these functions can normally be done better and faster by a digital computer using the signals in digital form.

Such seismic signals are nearly always filtered. One way this has been done in an analog filter is by means of electrical inductance capacitance networks which are designed to have an impulse response of the desired character. It is also possible to filter, or to convolve, a time function $S_t$ with an operator $S_c$ by means of a delay line filter or delay line correlator in which a delay line network is arranged with signal taps at spaced time delayed points and a plurality of potentiometers connected to these taps adjusted to appropriate settings to represent the digital values of the operator. These potentiometers can be set manually or by electronic switch means from a control device, which as will be seen, in accordance with the present invention can be a digital computer.

In digital filtering or convolution, the classic method is to perform a series of multiplication of ordinates $S_0, S_1, S_2 \ldots S_n$ of the signal $S(t)$ with the ordinates $G_0, G_1, G_2 \ldots G_n$ of the operator or convolving function $G(t)$ and sum the products. This provides one point on the convolution curve. The two functions are relatively displaced by a time interval $\tau$ and the process is repeated to provide a second point, and so on, until sufficient points have been obtained. This operation can be described mathematically by $$\phi s(t)^{(\tau)} = \frac{1}{T_0} \int_0^T s(t) G(t+\tau) dt$$

in which $S(t)$ represents a reflected seismic signal and $G(t)$ may represent a control or other selected signal, and $T$ is a selected time interval. The evaluation of the function $\phi S(t)^{(\tau)}$ involves multiplication of corresponding ordinates (of $S(t)$ and $G(t)$ and summing of the products for each of the many values of $\tau$.

A field use of the convolution of signals in seismic geophysical surveying is described, for example, in patent application Ser. No. 450,806 of Silverman and Treitel, filed Apr. 26, 1965. In that application a seismic source is initiated to produce a down-traveling seismic wave or pulse. Reflections of this pulse from subsurface interfaces are detected at the surface by sensitive transducers commonly known as geophones. The signal thus detected is recorded and in one form of the operations described in the Silverman-Treitel application is convolved with a Weiner operator. In other situations the received signal is correlated with the known form of the input signal or other correlating function $G(t)$. In some cases the input signal can be several seconds long. When such input signal is to be convolved with the received signal it is seen that the total number of multiplications and additions is very large. The cost of such computations using digital computers is also seen to be great. Thus it becomes desirable to simplify the convolution processing.

In processing certain seismic signals, a part of the processing can best by done by a digital computer and a part by an analog computer. In accordance with this invention, this is performed on what can be called a hybrid-type digital computer-analog filter. In such hybrid apparatus the digital computer does what it can do most economically and the analog filter does what it can do most economically and yet be satisfactory. The time varying analog signals are first converted to digital signals. The digital computer portion of the hybrid apparatus carries out such processing as sorting, time corrections, stacking and stores the signals in storage means such as core storage. The digital data is read from the core storage and passed to a digital-to-analog converter to obtain a signal suitable for passing through the analog filtering means. Filter means then performs the desired filter operations such as the convolution discussed above. The output of the filter is either displayed, recorded or passed back through an analog-to-digital converter back into the core storage of the computer for additional processing.

The analog filter is a type which can have its characteristics readily varied. In one embodiment, the control of characteristic of the filter means is accomplished by commands from the computer. For example it is possible to adjust the analog filter characteristic on the basis of measurement of the harmonic content of the signal as determined by the digital computer or on a program stored in the computer. In another embodiment, the harmonic content of the signal can also be determined by analog means, using a suite of filters of special frequency pass bands, as will be described later.

It is thus an object of my invention to use a hybrid type seismic signal processing system in which a digital computer performs certain processing of the signal, and other processing is performed by analog filtering means and in which the filtering characteristic of the analog filtering means is varied as the signal is processed.

Other objects and a better understanding of the invention can be had from the following discussion taken in conjunction with the drawings in which.

Figure 1:
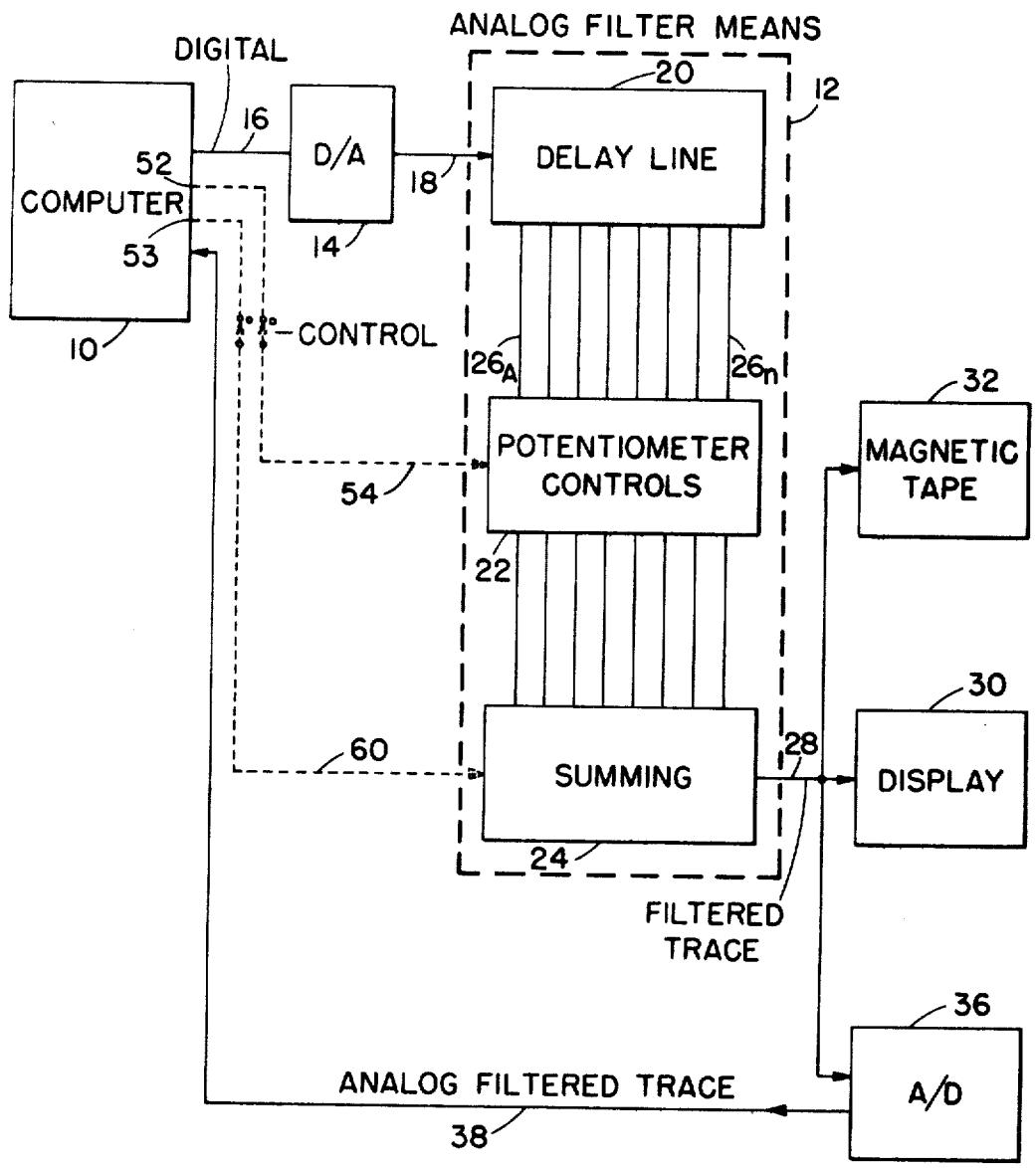
FIGURE 1 illustrates schematically the use of an analog delay line filter and associated circuitry in conjunction with a digital computer to perform convolution processing.

Attention is now directed to FIGURE 1 which illustrates in schematic form a broad concept of the present invention. Shown thereon is a digital computer 10 and what can be described as an analog filter means 12 enclosed by dashed lines. The two are arranged to complement each other in their operation. Modern digital computers now have output channels which can contain a very wide variety of information. This information is available at what is commonly referred to as "output channels." The information on the "output channels" can be the data being processed, or it may be "command" information. These computers can also receive information or commands from sources exterior of the digital computer itself. Such outside commands or signals are applied at what is generally termed "input channels." As is known, these input channels can receive information to be stored within the computers; it being common knowledge that most digital computers have internal storage which frequently is in the form of magnetic cores. The particular nature of the input and output channels will be discussed later as necessary to describe the invention.

Between digital computer 10 and analog filter means 12 there is a digital-to-analog converter 14. This is a device for reading the digital signals put into the output line 16 by the digital computer 10 and converting these signals to corresponding analog voltages, and impressing the resulting analog signals onto line 18. Analog-to-digital, and digital-to-analog converters are standard electronic equipments commercially available from many sources including the digital computer manufacturers. The analog output signal of converter 14 is connected by conduit 18 to the input of delay line 20 which is a part of the analog filter means 12. In addition to delay line 20, analog filter 12 includes potentiometer control means 22 and a summing means 24.

Figure 5:
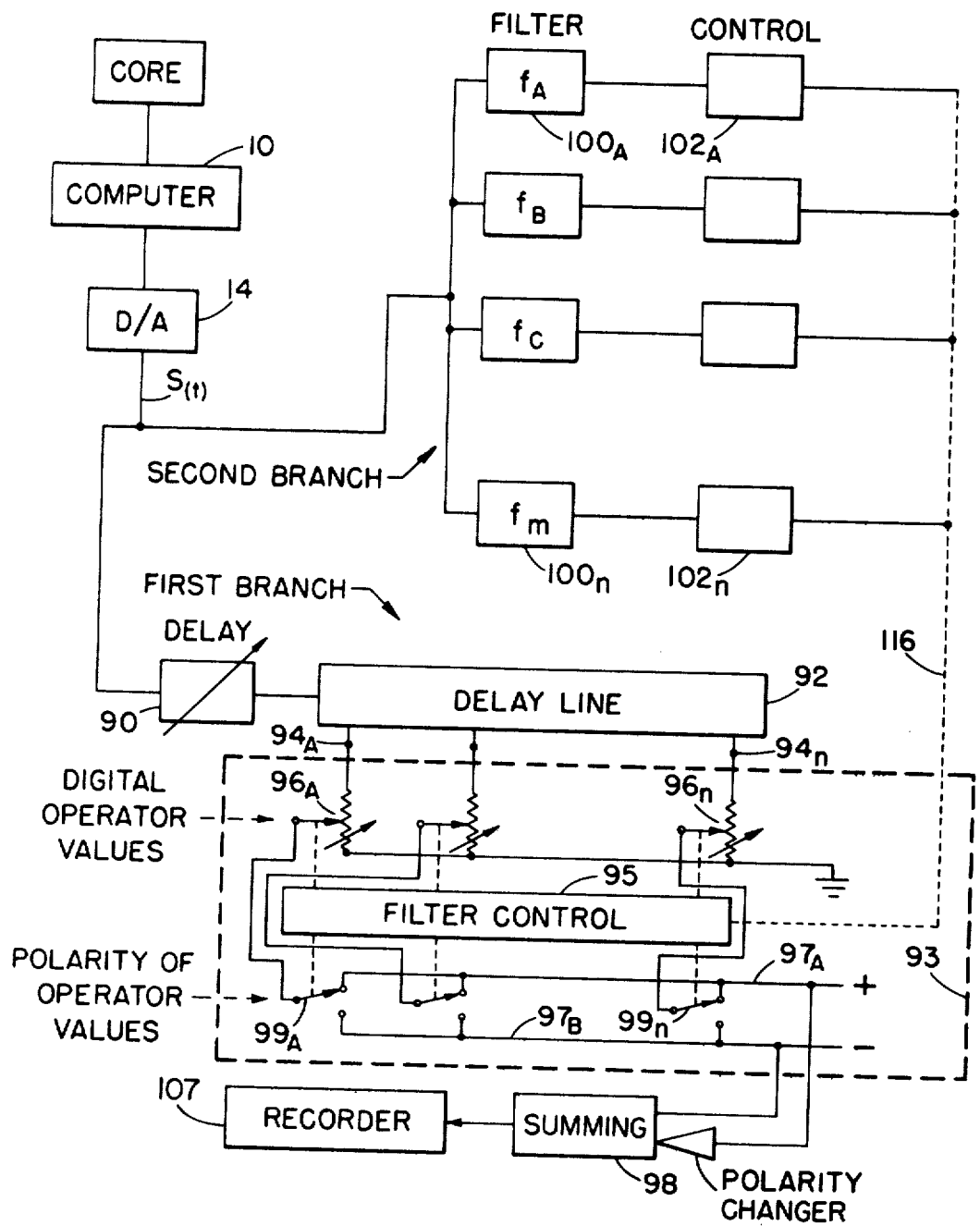
FIGURE 5 illustrates still another means of controlling a delay line correlator used in conjunction with a digital computer.

Delay line 20 has a plurality of output taps 26A to 26n for sampling or tapping the signal at various times as is shown for example in the prior application of Daniel Silverman, Ser. No. 358,870, filed Apr. 10, 1964. Further, the analog filter means 12 as shown is illustrated as a delay line filter and is shown more in detail in conjunction with FIGURE 2. The delay line 20 is provided with a plurality of take out taps 26A to 26n spaced along its length to present, at predetermined time delays, the analog function $S(t)$ applied to the input to the delay line; a multiplicity of potentiometer means 22 each connected to one of the taps for applying a second function to the apparatus; and an electrical summing network 24 connected to the potentiometric network for summing the outputs therefrom. As will be seen potentiometric controls 22 and summing networks 24 can be hand-controlled or controlled by command information on lines 54 and 60 respectively from output channels 52 and 53 respectively of digital computer 10, or as shown in FIGURE 5 controlled by a frequency analysis of the analog signal itself prior to passing into the delay line. The output of analog filter means 12 is from summing network 24 and is provided on conduit 28. This output can be used in one or more of several ways. It can be displayed on a display means 30; it can be recorded on magnetic tape 32 or it can be passed through analog-to-digital converter 36 and returned to computer 10 through line 38. The signal thus filtered and converted back to digital form can be either stored in digital computer 10 or used for additional processing.

It is thus seen that FIGURE 1 illustrates a hybrid-type signal processing system using a digital computer for performing certain process functions on the seismic signals such as time corrections, move outs, stacking, etc. The output seismic signal from the digital computer is processed in the analog filter means 12 to perform certain analog filtering functions such as described in the above-mentioned application S.N. 358,870. The output of the analog filter means 12 can be displayed, recorded or converted to digital form and returned to the digital computer. Thus by the use of my system the digital computer can perform those functions which it can do best and most economically and the analog seismic filter means can perform those functions for which its accuracy is adequate and for which it can perform most economically.

Figure 2:
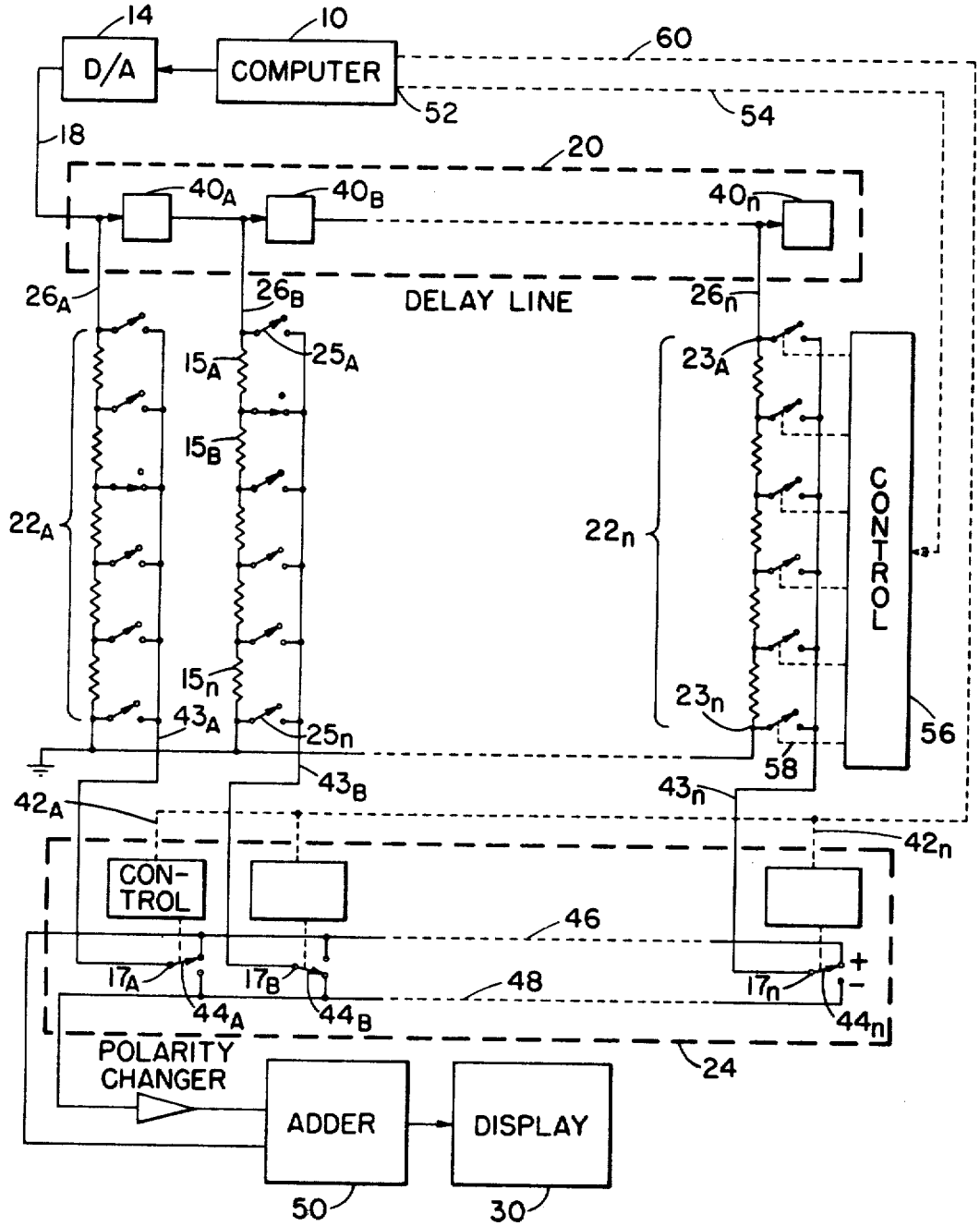
FIGURE 2 shows the potentiometers and controls of the delay line correlator of FIGURE 1 in greater detail.

Attention is next directed toward FIGURE 2 which illustrates the filter means 12 in greater detail. Also shown thereon is computer 10, digital-to-analog converter 14, display 30, similarly as shown in FIGURE 1. The output of digital-to-analog converter 14 is fed to delay line 20 which is comprised of a series of delay units 40A to 40n, each of which may be a lumped inductance-capacitance network, for time delays of an analog signal representative of a first function, such as an analog signal $S(t)$ which is fed to the apparatus from computer 10 through converter 14. Each delay line unit provides a specific known time delay $\tau$ which, for example, can be from one to about 4 milliseconds. These delay line units 40 are connected in series to provide the total time delay desired which typically is about equal to the duration of the signal $G(t)$ with which the signal $S(t)$ is to be convolved. For the sake of brevity, only a small number of delay units 40 are shown in FIGURE 2. However, in practice 25 to a hundred or more may be used. Multiple take-out taps 26A to 26n are spaced along the delay line 20 to present at specific constant time delays the signal voltage applied to the delay line. In general, if the signal $S(t)$ is to be filtered or convolved, the signal $G(t)$ with which it is to be convolved is called the "operator," or the characteristic of the filter.

A plurality of potentiometers 22A to 22n are connected respectively to taps 26A to 26n. The potentiometers 22A to 22n each comprise a plurality of resistances connected in series and having a plurality of output or take-off taps 23A to 23n. The particular potentiometer shown in FIGURE 2 for each take-off tap takes on the form of a voltage divider. Each of these taps 23A to 23n is connected through a switch 25A to 25n respectively to summing circuit 24 shown in the dashed outline. Only one of these switches 25A will be closed at a time for each potentiometer 22. The particular switch 25A closed is one which is a representation of time separated ordinates $G_0$, $G_1$, $G_2$ ... $G_n$ of the operator $G(t)$ if this signal is to be convolved with $S(t)$. Each switch 25A of each potentiometer 22 is connected to a conductor 43A to 43n to the base terminal of switches 44A to 44n respectively of the summing circuit 24. When the switches 44A are in the upper position they are connected to a positive bus 46 and when in a second or lower position they are connected to a negative bus 48. The reason for providing the negative and positive busses is that the values of the ordinate representations of the signal $G(t)$ may be positive or negative. The outputs of the two busses 46 and 48 are added in proper sign by adder 50 to provide the true output of the convolution of the signal $S(t)$ from digital-to-analog converter 14 with the operator $G(t)$ represented by the setting of the potentiometers 22A to 22n. The output of adder 50 can be displayed on display means 30 or as shown in FIGURE 1 it can be recorded on magnetic tape or converted to digital form and returned to and stored in digital computer 10.

In the discussion just made it was stated that the switches 25 were selected for each potentiometer 22 so as to incorporate the correct ordinate of the operator $G(t)$ corresponding to the value of time corresponding to the tap 26 to which the potentiometer is connected. This selection can be made and inserted manually by merely closing the corresponding switch, or it can be controlled by computer 10 by means of relay devices. For example, groups of diodes can be used to combine various input voltages or signal to produce an output to selectively operate a relay upon receiving the proper code. This is sometimes referred to as diode logic and is controlled by the computer.

Given the ordinate values of the desired operator, the computer 10 can be programmed to control the proper switches in the filter 12 to provide the proper circuits for the particular signal S(t) to be processed through the delay line filter. This can be accomplished in a conventional manner such as, for example, that described in the many textbooks on the design and programming of digital computers. This is shown schematically in FIGURE 2 by having an output channel 52 of computer 10 connected to line 54 to control 56. There can be provided such control means for each potentiometer means 22 although only one is shown for purposes of simplification. The control 56 has a plurality of output taps 58 which operate coded switches of potentiometer 22n as by diode logic. Likewise switches 44A to 44n can be moved into their upper or lower positions by coded signal over line 60 from computer 10. This control signal can be on a single line and the control means for each switch 44A to 44n responsive only to selected codes. Alternately an individual line 60 can be connected to each control for each switch 44A and thus simplify the code for moving the switch from one position to the next. Although these switches are shown as being the electro-mechanical type it is to be recognized that when used with the digital computer they could be of the electronic variety.

Figure 3:
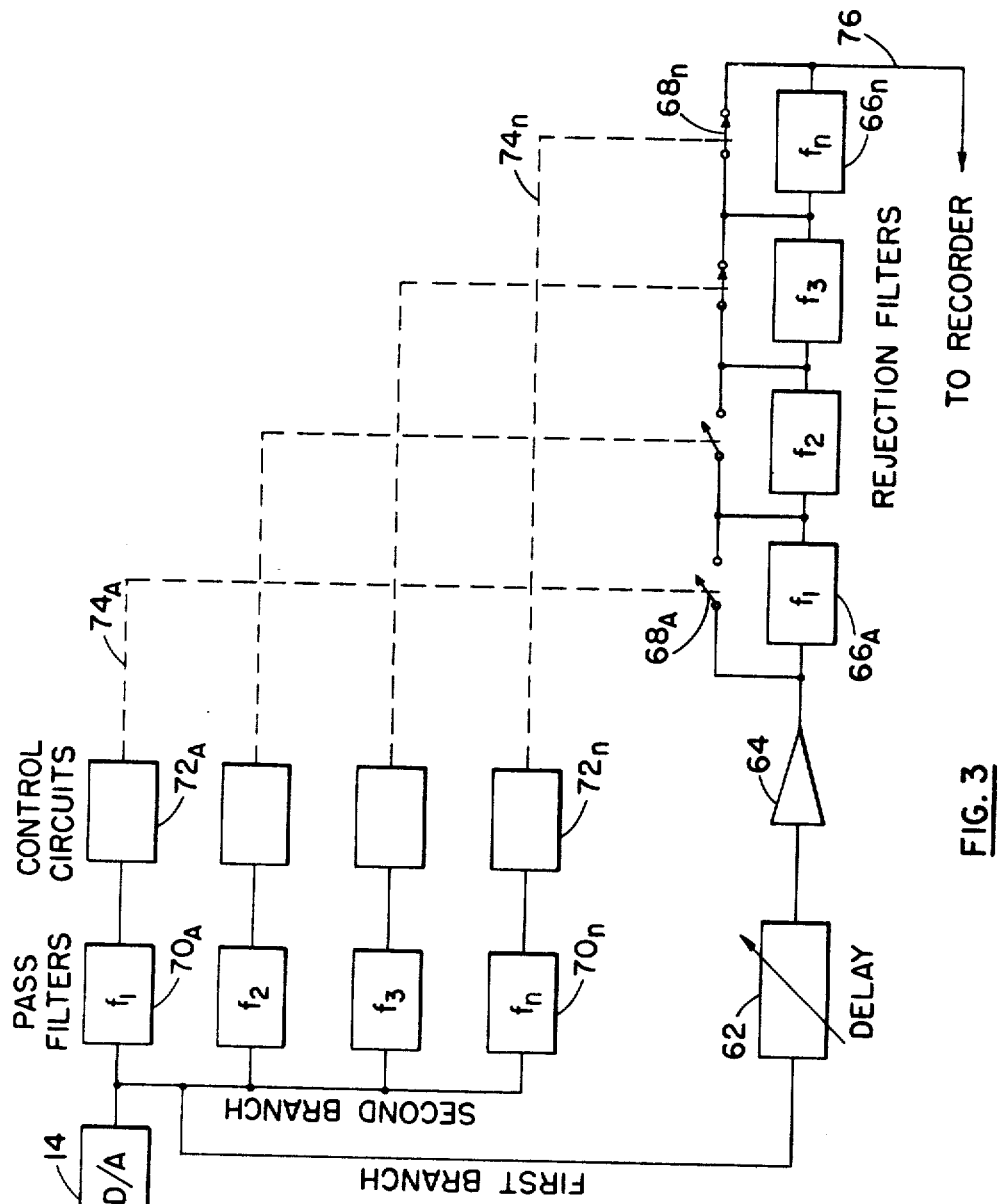
FIGURE 3 illustrates a novel analog filtering system which can be used in conjunction with the computer.

Attention is next directed to FIGURE 3 which shows a novel and an alternate analog filter from that described in FIGURES 1 and 2. Shown in FIGURE 3 is digital computer 10 and a digital-to-analog converter 14 for supplying a signal S(t) to the filter unit. This filter unit contains a first branch circuit and a second branch circuit. A first branch circuit includes a delay means 62, an amplifier 64 and a plurality of signal rejection filters 66A to 66n all in series. Filters 66A to 66n are notch filters which are tuned to reject a rather narrow band width of frequencies. The frequency band which the filters reject is preferably about one cycle in width and is represented as frequencies $f_1$, $f_2$, $f_3$ . . . $f_n$ for the respective filters. Each filter 66A to 66n has a shunt connection containing switches 68A to 68n respectively.

Whereas the first branch circuit of the filter of FIGURE 3 contains rejection filters the second branch circuit contains tuned filters which pass only a narrow frequency band of signals. These filters 70A to 70n are connected in parallel and each receive the same signal S(t) that goes to the first branch, from digital-to-analog converter 14. The tuned filter circuits 70A to 70n are tuned to pass the same narrow band of frequencies which the corresponding filters 66A to 66n are tuned to reject. The output of each filter circuit 70A to 70n is connected to a control circuit 72A to 72n which is of a type to determine the energy content of each frequency component passed through its corresponding filters 70A to 70n. Such control circuit can be as simple as a potentiometer in which the rectified output of the filter is continuously compared with a preselected voltage. When the rectified output of a particular frequency band reaches a predetermined level, that control circuit operates through operating means 74A to 74n to open the corresponding switch 68A to 68n. Thus if the energy of the frequency component passed through filters 70A represented by $f_1$ is too strong, this may indicate that it is an extraneous signal and should be rejected. This is accomplished by opening the proper switch 68A. The signal passing through the first branch then must go through filter 66A and the unwanted signal $f_1$ is rejected, the other frequencies passing through unchanged. Thus signals of frequencies having certain energies are selectively rejected by this system.

While I show the control operating means 74 connected to the control circuit 72, it will be clear that the outputs of the pass filters 70 can be analyzed in the digital computer and corresponding control commands generated therein which can be used to control the operating means 74, much as is shown in connection with FIGURES 1 and 2.

By providing delay means 62, filter bank 66A to 66n can be adjusted to accommodate the signal by the time that signal is passing through it. In other words the delay involved while the second branch circuit operates upon the signal to determine which frequency should be rejected is compensated by delay means 62 so that the rejection filters 66A to 66n are properly set by the time that the analyzed part of the signal S(t) reaches them. The amount of delay 62 should be enough to compensate for the time delay involved in passing through the filters 70A and associated circuitry including the switches or relays 68, etc., which can for example be about 10–50 or 100 milliseconds. The delay means 62 can of course be adjustable in value of delay. The output of the filter means of FIGURE 3 is the output on line 76 and can be utilized similarly as the output of the other filters of FIGURES 1 and 2.

Figure 4:
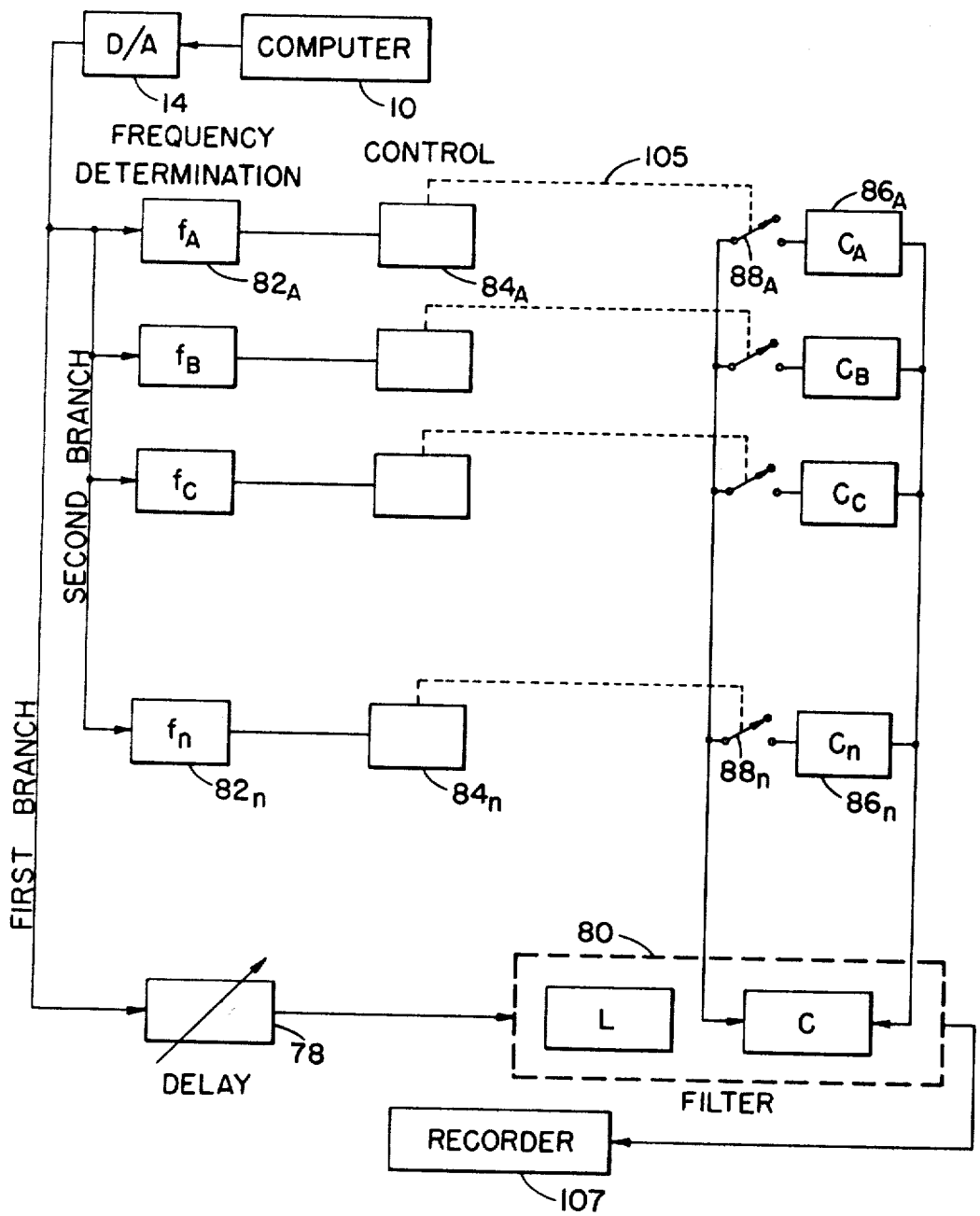
FIGURE 4 illustrates another analog type filtering system for use with a digital computer.

FIGURE 4 illustrates still another embodiment of a filter for use with digital computer 10 and digital-to-analog converter 14. It, like FIGURE 3, includes two branches. First branch contains a delay means 78 and a filter 80 which as indicated can be an inductance and capacitance type filter. The output of this filter is recorded on recorder 107 or otherwise utilized similarly as in the other figures. The characteristics of filter 80 are changed by varying the capacitance as is known. I shall now describe a novel way to change this capacitance. This is done by the second branch circuit which may be used to make a harmonic analysis. In other words the analog filter 80 is time-varying. The exact design of the frequency-time characteristics depends on the signal to be filtered and is determined from a harmonic analysis of the signal, which in this case is performed by the second branch circuit. The second branch circuit includes a plurality of narrow band pass filters 82A to 82n. The output of each filter 82A to 82n is connected to a control means 84A to 84n respectively. These control means can be similar to the control circuit 72A of FIGURE 3. For each filter $f_A$ to $f_n$ there is provided an associated, but not connected, capacitance 86A to 86n. These capacitances are connected through associated switches 88A to 88n to vary the capacitance of filter 80 when such switches are closed. The closing of these switches, which of course can be relays, are controlled by control circuits 84A to 84n, each of which operates to close its respective switch when the energy content of the signal of its associated filter reaches a predetermined amount.

In the LC (inductance-capacitance) filter 80, the frequency band passed by the filter is a function of the specific values of L and C. In practice there are generally several stages of LC networks rather than a single LC network. To change the pass band of the filter, the values of L and/or C must be changed. Since the value of C can be changed simply by adding differential values of capacitance, this process is schematically indicated in FIGURE 4. Here only one capacitance C is shown for convenience to which is added one or the other of the capacitances 86 by control of switches 88, which could be relays, for example, controlled by means shown schematically as 105.

The determination of the harmonic content of the signal is made by the filters 82. This, coupled with the predetermined selection of the level of output of the filters 82 that will cause switching 88 to connect capacitances 86 to the C of the LC network in 80, control the filter 80 to provide the desired pass band.

Attention is next directed to FIGURE 5 which illustrates, for example, how the delay line correlator of FIGURE 2 has its potentiometers set as a function of the frequency content of the signal S(t). Here, as in the other figures, digital computer 10 is connected to analog converter 14. The output of digital-to-analog converter 14 is connected to a first branch circuit and a second branch circuit. As in FIGURES 3 and 4 the first branch is delayed from the second branch circuit. Here too the second branch analyzes the signal and acts to control the filtering function of the first circuit branch. The first branch includes a delay means 90 which is connected to delay line 92. Delay line 92 has a plurality of output taps 94A to 94n each of which has a variable potentiometer 96A to 96n connected thereto. The output of these potentiometers are connected to a summing circuit 98 after first being connected through switches 99A to 99n to the proper bus bar 97A or 97B depending upon its polarity similarly as described in connection with FIGURE 2. In general, the choice of the settings of potentiometers 96 and the settings of switches for the polarity is dependent on the frequency content of the signal being processed. This frequency content is determined by the filters of the second branch circuit, $f_A$–$f_n$, represented by numerals 100A to 100n. These filters each pass a frequency band which depends upon the purpose of the filtering. If the purpose of the filter 93 is to eliminate sharply tuned interference (as in FIGURE 3), then the filters 100 will have very narrow band pass, preferably not over about 1 or 2 c.p.s. in width. On the other hand, if the filter 93 is to do rather broad filtering, then the analyzing filters 100 will also be broadly tuned to match the desired pass bands in the filter 93.

The output of each filter 100A to 100n is connected to a corresponding control unit 102A to 102n, which may be similar to those of FIGURE 3, for example. Thus when a frequency component such as $f_A$ reaches a preselected energy level, the associated control 102A has an output which is passed over multiple conductor line 116 to filter control 95. Control 95 can be similar to control 56 of FIGURE 2. By using diode logic, a particular number of outputs from controls 102A to 102n causes a particular operation of switches 96A to 96n and 99A to 99n. Each of the particular switching operations is dictated by the filtering action desired for each of the particular combination of frequency components exceeding a selected energy level.

While the control commands are indicated as passing by line 116 from the control units 102, which might be similar to FIGURE 3, for example, it is possible to use the computer 10 to make the analysis of frequency content of the signal applied to filters 100, and to generate appropriate commands to control potentiometers 96 and the summing switches. The art of the design, construction and programming of digital computers is well advanced as evidenced by the many scientific and technical papers published and the many text books and equipment catalogs which describe the construction and operation of digital computers, storage devices, digital-to-analog and analog-to-digital converters, and similar devices. Examples of the latter are the text books: Transistor Logic Circuits, by Richard B. Hurley published by Wiley, 1961, and, Switching Circuits with Computer Applications, by Watts S. Humphrey, Jr., published by McGraw Hill, 1958. Also useful in this connection are the manufacturers of equipment components who public informative catalogs such as the Catalog S–3 of Digital Logic Modules, published by Computer Control Co. of Framingham, Mass.

While the above embodiments of my invention have been described with a certain amount of detail, various modifications can be made therein without departing from the scope of my invention.

I claim:

1. An apparatus for processing time-varying signals which includes:
   a digital computer having at least one output and an input channel including a time-varying signal output channel;
   a digital-to-analog converter connected to said time-varying signal output channel of said digital computer;
   an adjustable analog filter means connected to the output of said digital-to-analog converter, such filter means including
      (1) analyzing means for analyzing the frequency content of the output of said digital-to-analog converter, and
      (2) control means responsive to said analyzing means to adjust the frequency characteristics of said analog filter means; and
   utilization means connected to the output of said analog filter means.

2. An apparatus as defined in claim 1 including an analog-to-digital converter connected in a circuit between said analog filter means and the input channel of said digital computer.

3. An apparatus for processing time-varying signals which includes:
   a digital computer having at least one output channel and an input channel including a time-varying signal output channel and a potentiometer control channel;
   a digital-to-analog converter connected to said time-varying signal output channel of said digital computer;
   a delay line means connected to the output of said digital-to-analog converter, said delay line means having a plurality of output taps for taking off analog signals at various times;
   a potentiometer means connected to each said output tap;
   means for varying the effective resistance ratio of each said potentiometer means;
   means for summing the outputs of said potentiometer means;
   means for utilizing the summed outputs of said potentiometer means; and
   means connecting said potentiometer control channel of said digital computer to said potentiometer means such that the resistance ratio of said potentiometer means is controlled by commands by said control channel means of said digital computer.

4. An apparatus for processing time-varying signals which includes:
   a signal source;
   adjustable analog filter means including a first circuit branch and a second circuit branch, each said branch being connected to the output of said signal source;
   said first circuit branch including a delay means, a plurality of filters having different frequency characteristics and connected in series, shunt means around each individual filter, each said shunt means having switch means therein;
   said second circuit branch including a plurality of filters connected in parallel, said filters of said second circuit branch having filter characteristics matching those of said first branch, control circuits connected to each said filter in said second circuit branch for determining the energy content of the signal passed by each such filter of said second circuit branch and including means to open said switch of its associated filter in said first circuit branch when the energy level in the frequency component of its associated filter in said second circuit branch reaches a preselected value.

5. Apparatus as in claim 4 including a digital computer having at least one output channel and an input channel including a time-varying output channel, a digital-to-analog converter connected to said time-varying signal output channel of said digital computer, and means connecting the output of said digital-to-analog converter to said analog filter means.

6. An apparatus for processing time-varying signals which includes:
   a signal source;

analog filter means including a first circuit branch and a second circuit branch connected in parallel, each said first circuit branch and said second circuit branch being connected to said signal source;

said first circuit branch including a delay means and a filter means connected to the output of said delay means, said filter means of said first branch being provided with means for adjusting its frequency characteristics;

said second circuit branch including means for determining the energy content of different discrete frequency bands within a selected range and means for varying the frequency characteristics of said filter means of said first circuit branch as a function of the energy content of different frequencies of said seismic signal;

and means for utilizing the output of said first branch.

7. An apparatus as defined in claim 6 in which said filter means of said first circuit branch includes a plurality of rejection filters tuned to reject frequencies of $f_1, f_2, f_3 \ldots f_n$ a shunt around each filter $f_1, {}_2, f_3 \ldots f_n$; and a switch in each said shunt;

and in which said second circuit branch includes a plurality of parallel tuned filters being tuned to pass frequencies $f_1, f_2, f_3 \ldots f_n$; and control circuits connected to each said tuned filters to determine the energy content of each said frequency, each control circuit for each said tuned control circuit being connected to the switch in the shunt of the associated rejection filter in said first circuit branch to open said switch in such associated shunt when the energy content of the associated frequency reaches a preselected value.

8. Apparatus as in claim 6 including a digital computer having at least one input channel and an output channel including a time-varying output channel, a digital-to-analog converter connected to said time-varying signal output channel of said digital computer, and means connecting the output of said digital-to-analog converter to said analog filter means.

9. Apparatus as in claim 6 in which the means for utilizing the output of said first branch comprises a data display means.

10. Apparatus as in claim 8 in which the means for utilizing the output of said first branch comprises an analog-to-digital converter connected to the said input channel of said computer.

11. An apparatus as defined in claim 6 including a digital computer having a control command output channel and in which said means for adjusting frequency characteristics of said filter means of said first circuit branch is connected to said digital computer to receive control commands therefrom.

12. Apparatus as in claim 8 in which the said filter means in said first circuit means comprises, a delay line means having a plurality of output taps for taking off analog signals at various times, a potentiometer means connected to each said output tap, means for varying the effective resistance ratio of each said potentiometer means, and means for summing the outputs of said potentiometer means.

13. Apparatus as in claim 12 in which said means for varying the effective resistance of each potentiometer means is responsive to control signals from said digital computer.

14. Apparatus as in claim 6 in which said means in said second circuit branch for determining the energy content of different discrete frequency bands comprises a plurality of band pass filters in parallel connection each one tuned to a predetermined frequency band different from each of the others.

15. Apparatus as in claim 6 in which said filter means in said first circuit branch comprises an inductance-capacitance filter including means to change the tuning of said filter by at least a change in said capacitance.

16. An analog seismic signal filter which comprises a first circuit branch and a second circuit branch each connected to receive the same analog signal;

said first circuit branch including a delay means for delaying the seismic signal a selected time, a plurality of rejection filters tuned to reject frequencies of $f_1, f_2, f_3 \ldots f_n$; a shunt around each filter $f_1, f_2, f_3 \ldots f_n$ and a switch in each said shunt;

said second circuit branch including a plurality of parallel tuned filters being tuned to pass frequencies $f_1, f_2, f_3 \ldots f_n$; control circuits connected to each said tuned circuits to determine the energy content of each said frequency, each control circuit for each said tuned control circuit being connected to the switch in the shunt of its associated rejection filter in said first circuit branch to open said switch in such associated shunt when the energy content of the associated frequency reaches a preselected value.

References Cited

UNITED STATES PATENTS

| 2,794,965 | 6/1957 | Yost | 340—15.5 |
|---|---|---|---|
| 2,897,476 | 7/1959 | Widess | 340—15.5 |
| 2,908,889 | 10/1959 | Piety | 340—15.5 |
| 3,034,719 | 5/1962 | Anfenger et al. | 235—150.5 |
| 3,142,750 | 7/1964 | Silverman et al. | 340—15.5 |
| 3,146,343 | 8/1964 | Young | 235—150.5 |
| 3,287,695 | 11/1966 | Taylor | 340—15.5 |
| 3,303,335 | 2/1967 | Pryor | 340—15.5 |
| 3,323,104 | 5/1967 | Hadley et al. | 340—172.5 |
| 3,344,407 | 9/1967 | Koeijmans | 340—172.5 |
| 3,345,608 | 10/1967 | Brown et al. | 340—172.5 |

PAUL J. HENON, *Primary Examiner.*

JOHN P. VANDENBURG, *Assistant Examiner.*

U.S. Cl. X.R.

340—15.5; 235—150.5